Dec. 20, 1938. G. P. ROBERTS 2,140,971
BRAKE
Filed Dec. 5, 1936 3 Sheets-Sheet 1
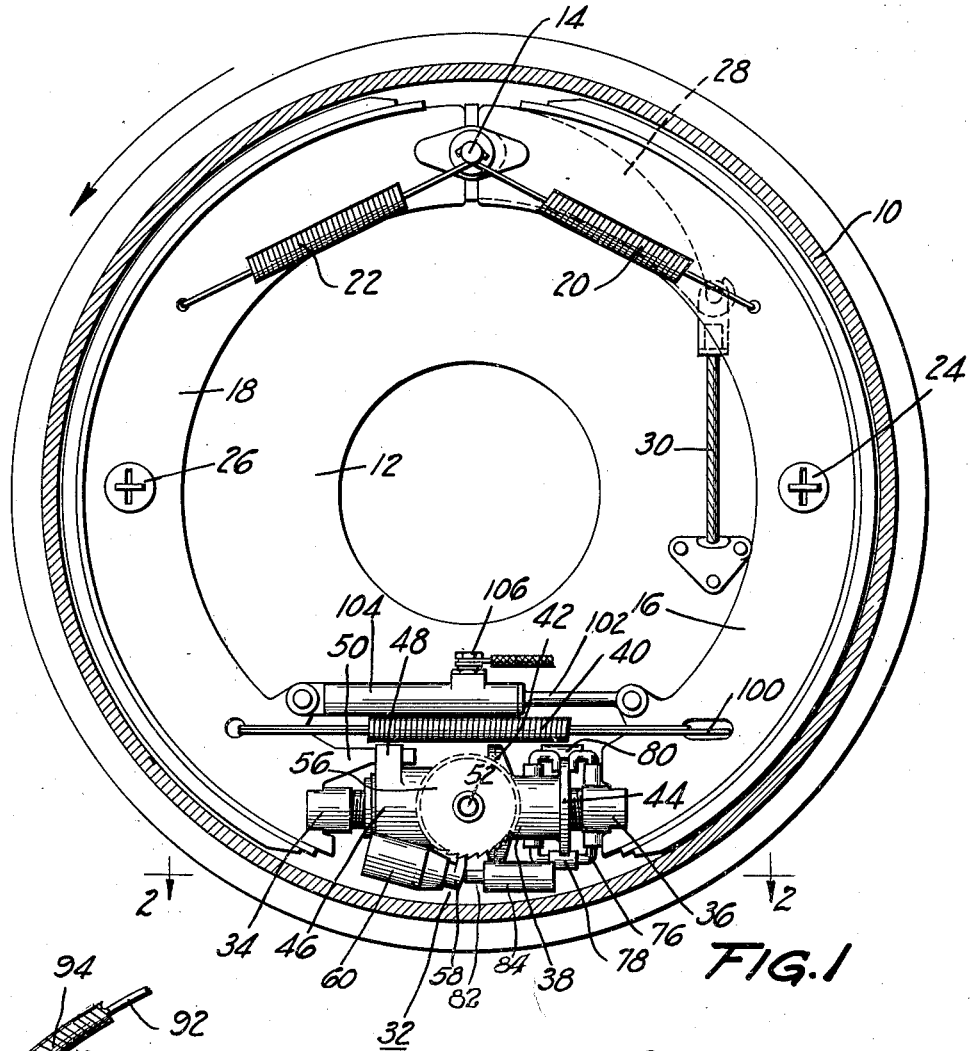
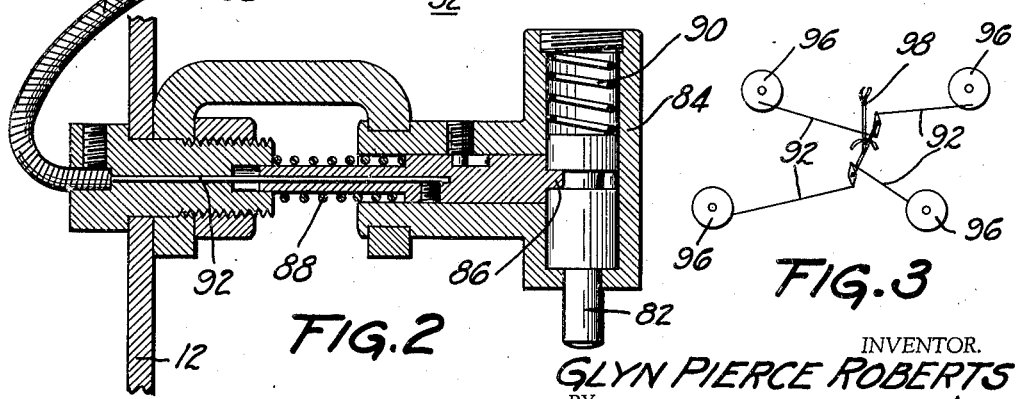
INVENTOR.
GLYN PIERCE ROBERTS
BY
ATTORNEY.

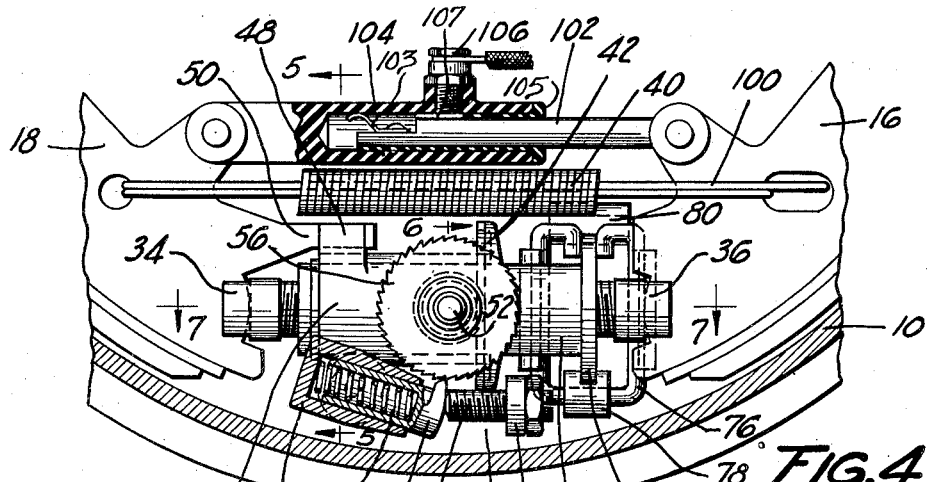

Dec. 20, 1938.    G. P. ROBERTS    2,140,971
BRAKE
Filed Dec. 5, 1936    3 Sheets-Sheet 3

INVENTOR.
GLYN PIERCE ROBERTS
BY
ATTORNEY.

Patented Dec. 20, 1938

2,140,971

UNITED STATES PATENT OFFICE 2,140,971

BRAKE

Glyn Pierce Roberts, Birmingham, England, assignor to Bendix Products Corporation, South Bend, Ind., a corporation of Indiana Application December 5, 1936, Serial No. 114,397
In Great Britain December 18, 1935

22 Claims. (Cl. 188—79.5)

This invention relates to brakes, and more particularly to automatic adjustments therefor.

An object of the invention is to provide a satisfactory automatic adjustment for vehicle brakes.

Another object is to provide a vehicle brake with an automatic adjustment which also has easily operable means for manually adjusting the brake if necessary or desired.

Still another object is to provide a brake with an automatic adjustment having means for rendering the adjustment inoperative when overheated.

A further object is to provide manual means, accessible to the driver, for rendering an automatic brake adjusting device inoperative, which means is operable even when the vehicle is in motion, and whereby the adjusting means may be maintained inoperative until the brakes need adjusting, and may then be rendered operative at the will of the driver at such times as the drums are cool and therefore susceptible to correct adjustment.

Other objects comprise the provision of means for preventing further adjustment of a brake after the brake lining is worn a predetermined amount, and means for indicating to the vehicle driver that the lining is so worn and requires replacement.

Other objects and desirable particular constructions will be apparent upon reference to the following detailed description of several illustrative embodiments of the invention illustrated in the accompanying drawings in which:

Figure 1 is a section just inside the head of the drum of a brake employing the invention;

Figure 2 is a section on the line 2—2 of Figure 1;

Figure 3 is a diagrammatic view showing four brakes as they would be attached to an automobile, and showing a common operating means for a member in said brakes;

Figure 4 is a fragment of a view similar to Figure 1 showing a modification;

Figure 5 is a section on the line 5—5 of Figure 4;

Figure 6 is a section on the line 6—6 of Figure 4;

Figure 7 is a section on the line 7—7 of Figure 4, but with parts omitted;

Figure 12 is a section through part of the panel mechanism of Figure 4.

The embodiments of Figures 1-3 inclusive and Figures 4-7 inclusive are identical except for the construction of the fixed pawl stop to be described later, and consequently they will be described together, the same reference numerals being applied to identical elements.

Figure 8:
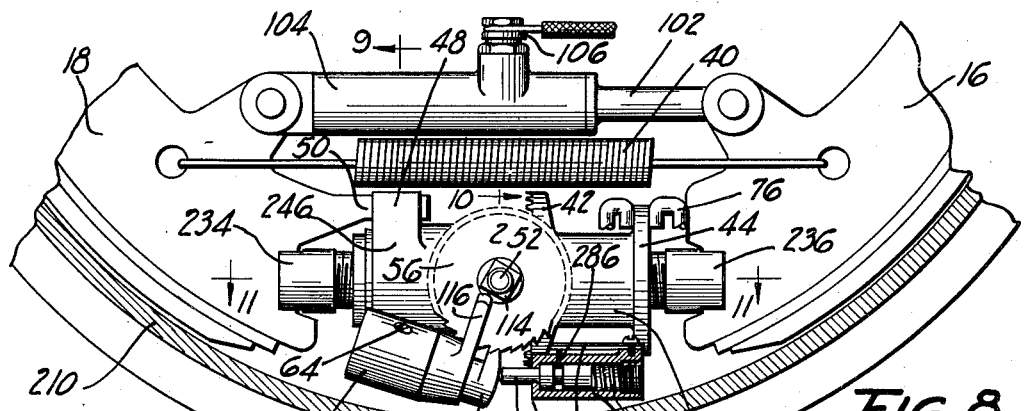
Figure 8 is a fragment of a view similar to Figure 1 showing another modification.

I prefer to employ the invention on a brake comprising a brake drum 10, closed at one end by a fixed backing plate 12, to which is secured an anchor pin 14. A pair of generally semicircular friction shoes 16 and 18 are mounted on the backing plate within the drum, and have one pair of adjacent ends in engagement with the anchor 14 when in released position. Springs 20 and 22 serve to return and hold the shoes in released position, and the usual steady rests 24 and 26 hold the shoes yieldingly against the backing plate.

A floating applying lever 28, or any other suitable applying means e. g. a fluid power cylinder, is mounted between the anchored shoe ends, and may be provided with a tension cable 30 to operate the brake. The cable preferably extends through the backing plate at an acute angle into a flexible conduit (not shown) forming, in effect, an extension of the brake enclosure.

My novel adjusting device 32 is floatingly interposed between the other pair of adjacent shoe ends, and comprises a pair of oppositely threaded plungers 34 and 36, notched at one end to receive the shoes and having their other ends threaded into opposite ends of a sleeve 38. A spring 40 holds the shoes against the plungers.

The sleeve 38 is provided with a crown wheel 42 for rotating the same, and with a collar 44 for engagement with a centering device to be described below. A second sleeve 46 is borne concentrically by the sleeve 38, and has a projecting fork 48 engaging a tongue 50, integral with the shoe, whereby the sleeve 46 is prevented from rotating.

A stub shaft 52, projecting from the sleeve parallel to the brake axis, has pivoted thereon a pinion 54 engaging the crown wheel 42, and, secured to the pinion on the same shaft, is a ratchet wheel 56 engaged by a pawl 58 slidable in a guide 60 and urged in operative direction by a spring 62. Set screw 64 (Figure 5), engaging a slot in the pawl 58, limits the movements of the pawl in the guide.

The guide 60 has a shaft 66 formed integrally therewith, pivoted in a projection of the sleeve 46 and projecting out of the backing plate through an appropriate opening. A helical torsion spring 68, tensioned between this shaft and the sleeve 46, urges the pawl against the ratchet wheel 56. The end of the shaft has flats milled thereon, or may be otherwise suitably formed to receive a key or tool with which the pawl may be thrown out of engagement.

On the opposite side of the sleeve 46, coaxial with the stub shaft 52, is an integral boss 70 provided with a bore adapted to receive a pilot formed on the end of a key 72. The key is provided with a pinion 73 adapted to engage the crown wheel 42. A suitable opening 74 is provided in the backing plate for the insertion of this key.

The centering device mentioned above is of the type described and claimed in a copending application of John S. Irving, now issued as Patent No. 2,084,972, granted June 22, 1937, and comprises a spring steel wire 76 bent into the form of a U and held in a steel stamping 78, preferably adjustably secured to the backing plate adjacent the flange 44 of the sleeve 38. The ends of the U-shaped wire are bent out from the backing plate and engage opposite sides of said flange. A tongue 80 on the stamping 78 is bent up between the ends of the wire to hold them apart a distance equal to the width of the flange.

Referring now particularly to Figures 1 and 2, the above-mentioned fixed pawl stop of this embodiment comprises a plunger 82, axially slidable in a housing 84 secured to the backing plate, and positioned so that the plunger contacts the pawl 58 when the brakes are in released position and the pawl is at its outermost position, relative to its guide 60, as determined by the set screw 64. The plunger is held in position in the housing 84 by a detent 86 which engages a groove in the plunger. A spring 88 holds the detent in operative position. Another light coil spring 90 backs up the plunger 82 and urges it into position to be engaged by the detent. A wire 92 secured to the detent passes out of the brake through the backing plate and into a flexible conduit 94.

Figure 3 illustrates a plurality of brakes 96 as they would be positioned in a vehicle and shows how the wires 92 may all be brought to a common operating lever, such as 98, positioned near the vehicle operator, and enabling him to withdraw the detents of all the brakes from operative engagement with the plungers 82.

In operation, the modification of Figures 1–3 is normally mounted so that when the vehicle is moving forward the brake drum rotates in the direction of the arrow. Tension applied to the cable 30, expands the shoes against the drum, and they rotate with it until shoe 16 bears against the anchor 14, the torque of shoe 18 being applied against the lower end of the shoe 16 through the adjuster 32.

The rotation of the shoes causes a translatory movement of the adjuster 32 to the right, and the pawl 58 is moved into its guide 60 and relative to the teeth of the ratchet wheel 56 by contact with the fixed pawl stop 82. If the brake is sufficiently worn the pawl engages a new tooth on the ratchet wheel, and upon release of the brake and the return of the shoes to centered position by the spring 76, the spring 62, acting on the pawl, urges it back to its original position, thereby rotating the ratchet wheel, the pinion 54, and the crown wheel 42 and causing the threaded plungers 34 and 36 to be screwed outwardly to expand the shoes.

In reverse braking, the opposite shoe anchors, and the adjusting mechanism shifts to the left, moving the pawl 58 away from the stop 82. The pawl is held from rotating the ratchet wheel under the influence of the spring 62 by the set screw 64, (see Figure 12) which seats against the end of the slot in pawl 58 in which it rides. Thus no adjustment takes place in reverse braking.

By means of the lever 98 the operator may, at any time, withdraw the detents 86 holding the pawl stops. When this is done, the stop merely slides back in the housing 84 when the brake is applied, and no adjustment takes place. It will be understood that spring 90 is much lighter than spring 62. Thus the operator may render the automatic adjustment inoperative until the brakes need adjusting, thereby preventing any difficulties such as over-adjustment when the brakes are overheated and the like.

If it should become necessary or desirable for any reason to manually adjust the brakes, this is easily accomplished by placing a key on the shaft 66 and rotating the pawl out of engagement with the ratchet wheel and then inserting the key 72 through the opening 74 into the boss 70 and turning the crown wheel in either direction by means of the pinion formed on the key.

An important minor feature of the invention resides in providing the wire 100 passing through the bore of the spring 40 and hooked on each end to engage the shoes and prevent further expansion thereof when the brake linings are worn out.

Another minor feature of the invention is the provision of two telescoped members 102 and 104 pivoted respectively on the shoes 16 and 18 adjacent the adjustment 32. The member 104 is of insulating material and the member 102 is of metal and is grounded to the shoe 16. An insulating sleeve 105 may be provided as a liner for the member 104. An electrical contact 106, secured to one of the members, is closed by relative movement of the members when the shoes have been expanded sufficiently to completely wear out the linings. Member 102 carries a spring contact 103 movable into a slot 107 in the sleeve 105 to engage the contact 106 and ground the circuit. The closing of this contact energizes a visual or audible signal of any desired type to inform the vehicle operator that the linings need replacing.

The modification of Figures 4–7 inclusive differs only from that just described in having a pawl stop in the form of a stud 108 adjustably threaded in a bracket 110, and locked therein by a suitable lock nut. This modification is intended to be mounted so that forward movement of the vehicle rotates the drum in the direction of the arrow (opposite to that of Figure 1). Thus, adjustment takes place only in reverse braking, making it improbable that over-adjustment would take place when the brake drums are highly heated. The gear reduction between pinion 54 and the crown wheel 42, and the large number of teeth on the ratchet wheel 56 provide an additional element of safety in this regard, in that each brake operation makes only a minute adjustment.

Figures 9, 10:
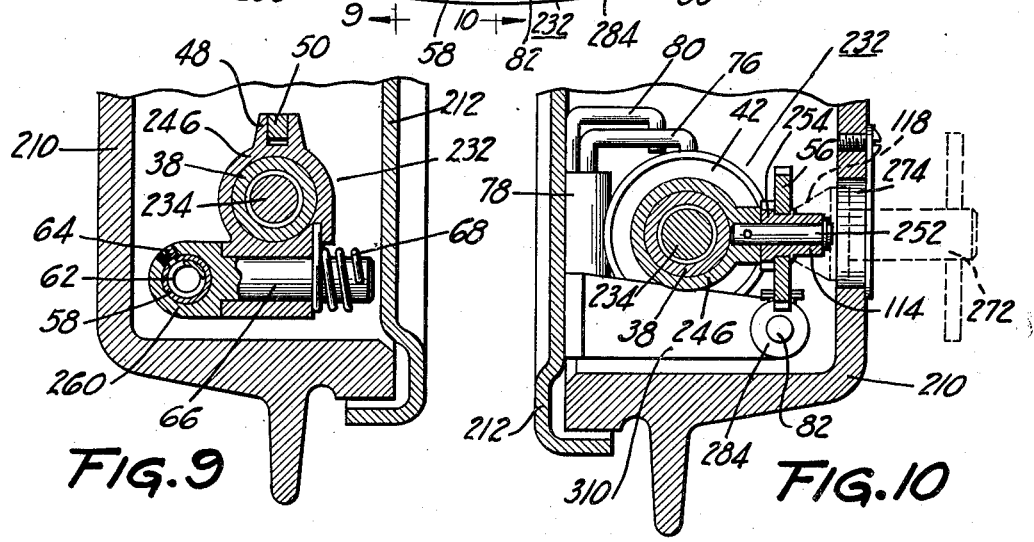
Figure 9 is a section on the line 9—9 of Figure 8.
Figure 10 is a section on the line 10—10 of Figure 8.
Figure 11:
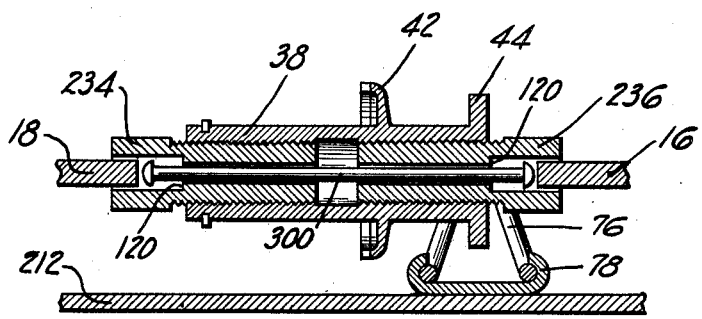
Figure 11 is a section on the line 11—11 of Figure 8, but with parts omitted.

The modification of Figures 8–11 differs from those previously described in only a few respects which will now be pointed out. Identical elements in these figures have the same reference numerals while corresponding elements have the same reference numerals plus 200.

The fixed pawl stop of this modification comprises a plunger 82, axially slidable in a housing 284, secured to the backing plate 212 by means of a bracket 310. It is held in place by a detent 286, secured to a bimetallic element 112 mounted on the housing 284, and operable to withdraw the detent and render the adjustment inoperative when the brakes are overheated.

Another difference resides in the provisions for manual adjustment. The pinion 254 is provided with a squared projection 114 adapted to receive a key 272 inserted through an opening 274 in the brake drum 210. The pawl guide 260 has a finger 116 extending to a point adjacent the projection 114, and which is adapted to contact a conical end 118 of the key and force the pawl out of engagement with the ratchet wheel when the key is inserted. With this construction the key may be inserted and turned to either expand or contract the brake without the necessity of employing a second means to withdraw the pawl.

Another difference resides in the means for preventing additional expansion of the brakes beyond the point where the linings are completely worn out. This means comprises a headed wire 300 extending through alined bores in the threaded plungers. These bores are provided with shoulders 120 adapted to engage the heads on the wire when the plungers have been separated a predetermined amount.

While several illustrative embodiments of my invention have been described in detail, it is not my intention to be limited by those particular embodiments, or otherwise than by the terms of the appended claims.

I claim:

1. In a brake, a brake drum, an adjustable member for engaging the drum and arranged inside the drum, automatic means inside the drum operable when the brakes are released to adjust said member, and manual means extending outside the drum to interrupt the operation of said automatically operable means.

2. In a brake, a brake drum, an adjustable friction member inside the drum for engaging the drum, automatic means inside the drum operable when the brakes are released to adjust said member, means extending to a remote point outside the brake to manually interrupt the operation of said automatically operable means, and means to manually adjust the brakes.

3. In a vehicle having wheels, braking means associated with the wheels to stop the vehicle, adjustable means to vary the effective length of the braking means to compensate for wear, automatically operated means to actuate the adjustable means when the braking means has worn a predetermined amount, and manual means operable from a remote point to interrupt the operation of said automatically operated means.

4. In a vehicle having wheels, braking means associated with the wheels to stop the vehicle, adjustable means to vary the effective length of the braking means to compensate for wear, automatically operated means to actuate the adjustable means when the braking means has worn a predetermined amount, and manual means operable while the vehicle is in motion to interrupt the operation of said automatically operated means.

5. In a vehicle having wheels, braking means associated with the wheels to stop the vehicle, adjustable means to vary the effective length of the braking means to compensate for wear, automatically operated means to actuate the adjustable means when the braking means has worn a predetermined amount, and manual means operable to first disengage said automatically operated means and then to manually adjust the brake.

6. In a vehicle brake system having a plurality of inclosed brakes, an automatic adjusting device inside each brake, means in each automatic adjusting device for rendering it inoperative, and connections for manually actuating said means extending therefrom exteriorly of the brakes to a point accessible to the vehicle operator.

7. In a vehicle brake system having a plurality of brakes, automatic adjusting devices on each brake, means in each automatic adjusting device for rendering it inoperative, a common operating means for the first named means located at a point accessible to the vehicle operator, and connections from the first named means to the operating means.

8. An expansible device for adjusting a brake comprising a non-rotatable sleeve, a second sleeve rotatably mounted therein, shoe engaging plungers threaded in the second sleeve, a crown wheel formed on the second sleeve, a pinion pivoted on the first-named sleeve engaging the crown wheel, and means for rotating the pinion.

9. An expansible device for adjusting a brake comprising a non-rotatable sleeve, a second sleeve rotatably mounted therein, shoe engaging plungers threaded in the second sleeve, a crown wheel formed on the second sleeve, a pinion pivoted on the first-named sleeve engaging the crown wheel, and means for rotating the pinion, said means comprising a ratchet wheel secured to the pinion, and an automatically-operated pawl operable when the brake is applied in one direction of rotation.

10. An expansible device for adjusting a brake comprising a non-rotatable sleeve, a second sleeve rotatably mounted therein, shoe engaging plungers threaded in the second sleeve, a crown wheel formed on the second sleeve, a pinion pivoted on the first named sleeve engaging the crown wheel, and means for rotating the pinion, said means comprising a ratchet wheel secured to the pinion, an automatically operated pawl operable when the brake is applied in one direction of rotation, and auxiliary means for disengaging said pawl from the ratchet and manually adjusting the brake.

11. An expansible device for adjusting a brake comprising a non-rotatable sleeve, a second sleeve rotatably mounted therein, shoe engaging plungers threaded in the second sleeve, a crown wheel formed on the second sleeve, a pinion pivoted on the first-named sleeve engaging the crown wheel, and means for rotating the pinion, said means comprising a ratchet wheel secured to the pinion, an automatically-operated pawl operable when the brake is applied in one direction of rotation, and means for rendering said pawl inoperative at will.

12. An expansible device for adjusting a brake comprising a non-rotatable sleeve, a second sleeve rotatably mounted therein, shoe engaging plungers threaded in the second sleeve, a crown wheel formed on the second sleeve, a pinion pivoted on the first-named sleeve engaging the crown wheel, and means for rotating the pinion, said means comprising a ratchet wheel secured to the pinion, an automatically-operated pawl operable when the brake is applied in one direction of rotation, and thermostatic means for rendering said pawl inoperative when the brake is overheated.

13. In a automotive vehicle having brakes, an expansible device for adjusting the brakes comprising a non-rotatable sleeve, a second sleeve rotatably mounted therein, shoe engaging plungers threaded in the second sleeve, a crown wheel formed on the second sleeve, a pinion pivoted on the first named sleeve engaging the crown wheel, means for rotating the pinion comprising a ratchet wheel secured to the pinion and an automatically-operated pawl and auxiliary means operable by the driver of the vehicle when it is in motion for preventing the operation of said pawl.

14. In a brake, automatic means for adjusting the brake, and parts connected to the brake on opposite sides of said automatic means and forming a stop for preventing adjustment of the brake beyond a certain predetermined limit.

15. In a brake, automatic means for adjusting the brake, and means for preventing adjustment of the brake beyond a certain predetermined limit, said first named means having two separable members provided with alined bores and said second named means comprising a wire extending through said bores having enlarged ends engageable with said members at said predetermined limit of adjustment.

16. In a brake, a pair of generally semi-circular floating shoes, anchorage and applying means between one pair of adjacent shoe ends, an expansible device between the other adjacent pair of shoe ends, a coiled spring tensioned between said other pair of shoe ends to hold them in contact with said expansible device, and a wire passing through the bore of said coiled spring and formed at both ends with means engageable with the shoes to prevent their separation beyond a certain predetermined limit.

17. A vehicle brake having a drum, friction means within and engageable with the drum, automatic adjusting means within the drum to compensate for the wear of said friction means, auxiliary means for disengaging said automatic adjusting means to permit manual adjustment of the brake, and means for manually adjusting the brake.

18. A vehicle brake having a drum, friction means engageable with the drum having separable elements, automatic adjusting means connecting said elements and expansible for separating said elements to compensate for wear, contacts so constructed and arranged as to close when the adjusting means has separated said elements a predetermined amount, and a warning circuit including said contacts.

19. In a vehicle brake having a drum, friction elements and a support for said friction elements, automatic adjusting means for said friction elements floatingly mounted on said friction elements and having an operating pawl, an abutment secured to said support and operatively engaged by said pawl upon movement of the friction elements when the brake is applied, and a detent normally holding said abutment in operative position.

20. In a vehicle brake having a drum, friction elements and a support for said friction elements, automatic adjusting means for said friction elements floatingly mounted on said friction elements and having an operating pawl, an abutment secured to said support and operatively engaged by said pawl upon movement of the friction elements when the brake is applied, a detent normally holding said abutment in operative position, and means accessible to the driver of the vehicle and operable while the vehicle is in motion to withdraw said detent and render the abutment inoperative.

21. In a vehicle brake having a drum, friction elements and a support for said friction elements, automatic adjusting means for said friction elements floatingly mounted on said friction elements and having an operating pawl, an abutment secured to said support and operatively engaged by said pawl upon movement of the friction elements when the brake is applied, a detent normally holding said abutment in operative position, and thermostatic means for withdrawing said detent and rendering said abutment inoperative when the brake is overheated.

22. A vehicle having four wheels each provided with a brake having means for adjusting for wear, devices operated automatically by the application and release of the brakes for operating each adjusting means after predetermined wear of its brake, and means operable from a central point remote from the brakes for rendering said devices operative or inoperative at the will of the driver.

GLYN PIERCE ROBERTS.